United States Patent
Yin et al.

(10) Patent No.: US 7,284,418 B2
(45) Date of Patent: Oct. 23, 2007

(54) TIRE PRESSURE SENSOR ASSEMBLY

(75) Inventors: Jeffrey Yin, Wheeling, IL (US); Jen-Huang A. Chiou, Libertyville, IL (US); John T. Meagher, Hawthorn Woods, IL (US)

(73) Assignee: Temic Automotive of North America, Inc., Deer Park, IL (US)

( * ) Notice: Subject to any disclaimer, the term of this patent is extended or adjusted under 35 U.S.C. 154(b) by 47 days.

(21) Appl. No.: 11/144,992

(22) Filed: Jun. 3, 2005

(65) Prior Publication Data

US 2006/0272402 A1  Dec. 7, 2006

(51) Int. Cl.
*B60C 23/02* (2006.01)
*B60C 23/04* (2006.01)
*B60C 23/00* (2006.01)

(52) U.S. Cl. .............. 73/146.8; 73/146.3; 73/146.2; 73/146; 340/438; 340/443; 340/445

(58) Field of Classification Search .............. 73/146.8, 73/146.5, 146.3, 146; 340/438, 443, 445
See application file for complete search history.

(56) References Cited

U.S. PATENT DOCUMENTS

| | | | | |
|---|---|---|---|---|
| 4,510,484 A | * | 4/1985 | Snyder | ........................ 340/438 |
| 4,734,674 A | | 3/1988 | Thomas et al. | |
| 5,109,213 A | * | 4/1992 | Williams | .................... 340/447 |
| 5,119,066 A | | 6/1992 | Ballyns | |
| 5,285,189 A | * | 2/1994 | Nowicki et al. | ............ 340/447 |
| 5,637,926 A | * | 6/1997 | Zedonis | ..................... 307/10.1 |
| 5,853,020 A | | 12/1998 | Widner | |
| 6,005,480 A | | 12/1999 | Banzhof et al. | |
| 6,031,450 A | | 2/2000 | Huang | |
| 6,034,597 A | | 3/2000 | Normann et al. | |
| 6,175,301 B1 | | 1/2001 | Piesinger | |
| 6,472,243 B2 | | 10/2002 | Gogoi et al. | |
| 6,568,259 B2 | * | 5/2003 | Saheki et al. | ................. 73/146 |

(Continued)

FOREIGN PATENT DOCUMENTS

JP  2000-025430  * 1/2000

(Continued)

OTHER PUBLICATIONS

Schrader Electronics, "New Auto Rotation Technology", Ireland.

*Primary Examiner*—Edward Lefkowitz
*Assistant Examiner*—Punam Patel
(74) *Attorney, Agent, or Firm*—Gary J. Cunningham

(57) ABSTRACT

The disclosure provides a tire pressure sensor assembly that includes a battery and a printed circuit board (PCB) configured with electronics to measure tire pressure and to transmit an electromagnetic signal related to the measured tire pressure. The PCB and battery are contained in a housing that allows the PCB and the battery to be angularly oriented with respect to each other. Such orientation permits the sensor to conform to the curved surface of the rim. An embodiment of the disclosed tire pressure sensor assembly is adapted to fasten to a valve stem via a metal terminal. The attachment configuration permits the valve stem assembly to deform as the valve stem is installed in a rim and also allows the valve stem to function as a portion of the antenna structure to facilitate transmitting the RF signal to a receiver.

6 Claims, 4 Drawing Sheets

U.S. PATENT DOCUMENTS

| | | |
|---|---|---|
| 6,672,150 B2 | 1/2004 | Delaporte et al. |
| 6,722,409 B1 | 4/2004 | Martin |
| 6,888,449 B2 | 5/2005 | Lin et al. |
| 2002/0046599 A1 | 4/2002 | Chuang et al. |
| 2002/0168795 A1* | 11/2002 | Schuurmans ............... 438/106 |
| 2003/0066343 A1 | 4/2003 | Fischer et al. |
| 2003/0209065 A1* | 11/2003 | Fontenez ................ 73/146.8 |
| 2004/0046649 A1* | 3/2004 | Sanchez et al. ............ 340/443 |
| 2004/0070494 A1* | 4/2004 | Lin et al. ................... 340/445 |
| 2004/0155763 A1 | 8/2004 | Lin et al. |
| 2004/0263324 A1* | 12/2004 | Sanchez et al. ............ 340/442 |
| 2005/0092076 A1 | 5/2005 | Uleski et al. |
| 2005/0262934 A1* | 12/2005 | Naidu et al. .................. 73/146 |
| 2006/0185429 A1* | 8/2006 | Liu et al. ................... 73/146.5 |

FOREIGN PATENT DOCUMENTS

JP      2000-052726    *   2/2000

* cited by examiner

TIRE PRESSURE SENSOR ASSEMBLY

CROSS-REFERENCE TO RELATED APPLICATIONS

This application is related to U.S. patent application Ser. No. 11/144,549, filed concurrently herewith, entitled "Improved Package for a Tire Pressure Sensor Assembly,", which is incorporated herein by reference in its entirety.

BACKGROUND OF THE INVENTION

1. Field of the Invention

The present invention relates to a tire pressure sensor assembly for a tubeless tire.

2. Description of the Related Art

Electronic tire pressure sensors are becoming increasingly common in motor vehicles. Beginning Sep. 1, 2005, the National Highway Traffic Safety Administration (NHTSA) will phase in regulations that will require that manufacturers install tire pressure sensors in all light vehicles. See, e.g., Federal Motor Vehicle Safety Standards; Tire Pressure Monitoring Systems; Controls and Displays, 49 C.F.R. parts 571 and 585.

Various configurations for an electronic tire pressure sensor are described in the art, but most share the common basic features of: being coupleable to or part of a tire rim or a tire valve stem which fits into an opening in the rim to allow the tire to be filled with air; having an electronic pressure sensor for sensing the pressure in tire; and having a radio frequency (RF) transmitter for transmitting a radio signal indicative of the sensed pressure to the vehicle's computer. Such electronic tire pressure sensors are mounted inside the space between the tire and the rim and must be able to withstand the considerable g-forces that result from tire rotation. Most of the various configurations of tire pressure sensors in the art are the result of efforts to meet these requirements in ways that minimize the costs associated with the sensor systems and their installation. Various examples of electronic tire pressure sensors are described in U.S. Pat. Nos. 6,005,480, 5,853,020, 4,734,674, and 6,722,409, which are hereby incorporated by reference in their entireties.

A drawback to presently existing tire pressure sensors is that their installation requires an additional step beyond what is required to install a valve stem and/or valve stem assembly in a tire rim. For example, it is typical that installation of the tire pressure sensor involves techniques that involve fastening the sensor to the valve stem and/or to the rim, for example, by screwing or by bolting, which is time consuming. Moreover, many of these techniques require that the valve stem portion be first installed in the rim, and then the pressure sensor portion affixed to it in a separate step, which again adds complexity to the placement of the assembly in the rim. Additionally, prior techniques can result in an overall assembly which is expensive to manufacture, or which subjects the tire pressure sensor to potential damage during installation. An improved tire pressure sensor design is therefore needed, and this disclosure provides embodiments of such a design.

BRIEF DESCRIPTION OF THE DRAWINGS

Embodiments of the inventive aspects of this disclosure will be best understood with reference to the following detailed description, when read in conjunction with the accompanying drawings, in which.

DETAILED DESCRIPTION

An improved tire pressure sensor assembly for a vehicle is disclosed. The sensor assembly is adapted for mounting on a tire rim inside a tire. An embodiment of the tire pressure sensor portion of the assembly includes a battery and a printed circuit board (PCB) configured with electronics to measure tire pressure and to transmit a radio frequency (RF) signal related to the measured tire pressure to a receiver, for example, the vehicle's on board computer. The PCB and battery are contained in a housing that preferably allows the PCB and the battery to be oriented angularly with respect to each other. Such orientation permits the low profile sensor assembly to conform to the curved surface of the rim.

An embodiment of the disclosed tire pressure sensor assembly comprises the above-described tire pressure sensor portion coupled to a valve stem assembly. The valve stem assembly is mounted in the valve stem opening of the rim and the tire pressure sensor portion of the assembly is held in place via its attachment to the valve stem assembly. According to one embodiment, the tire pressure sensor is fastened to the valve stem via a metal terminal, which is configured such that the valve stem assembly can deform as the valve stem assembly is forced through the opening in the rim. The tire pressure sensor assembly can be preassembled prior to installing the valve stem assembly into the rim, which permits a tire/wheel manufacturer to install the tire pressure sensor assembly into the rim in one step rather than having to install the valve stem assembly and later install the tire pressure sensor in separate steps. Another advantage to attaching the sensor to the valve stem via a metal terminal is that the valve stem can function as an antenna external to the tire an rim assembly to facilitate transmitting the RF signal to a receiver. These and other advantages of the disclosed tire pressure sensor will be apparent to one of skill in the art in light of the disclosure.

Figure 1:
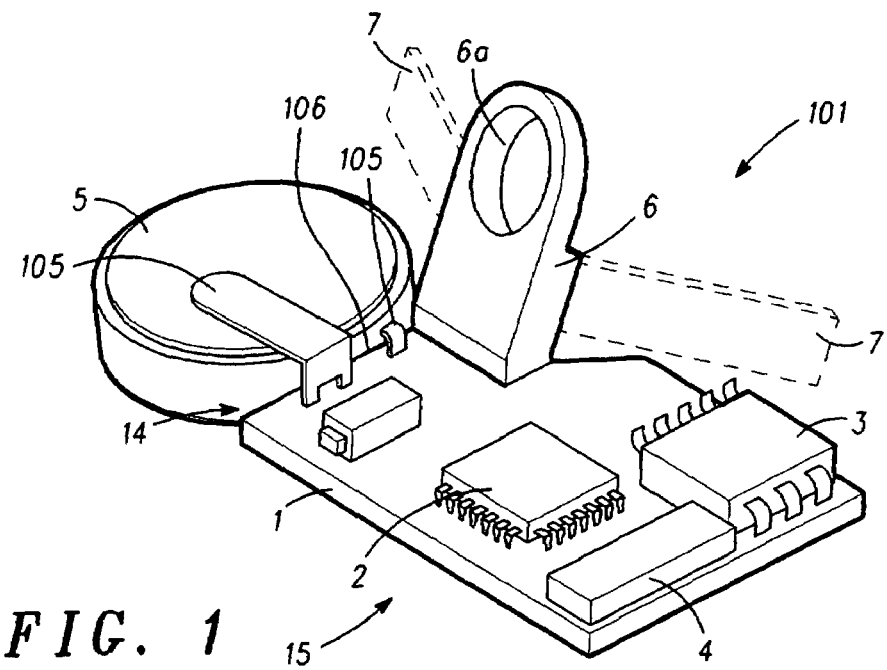
FIG. 1 illustrates a tire pressure sensor including electronics for sensing tire pressure and transmitting an RF signal related to tire pressure.

FIG. 1 illustrates an embodiment of the tire pressure sensor 101 useable in conjunction with a valve stem to form a tire pressure sensor assembly 102, which is discussed further with respect to FIGS. 2 through 6. Tire pressure sensor 101 includes a PCB 1 upon which the electronic components for sensing tire pressure and transmitting electromagnetic data, such as RF data related to tire pressure are supported. Such electronics and their functionality are well known in the art and will not be described here in detail. Briefly, the components include an integrated circuit (IC) 2 for reading a pressure sensor 3 and an RF transceiver 4 for transmitting data related to tire pressure to the vehicle's on board computer or to some other receiver. IC 2 is an application specific IC and it is within the ability of one of skill in the art to configure such an IC to read the presently disclosed pressure sensor. Examples of suitable ICs include the SP30 from Infineon Technologies (San Diego, Calif.), which features a pressure sensor and integrated microcontroller in a multichip module. Pressure transducer 3 can be any pressure sensor known in the art. For example, a CMOS capacitive pressure sensor is described in U.S. Pat. No. 6,472,243, the contents of which are incorporated herein by reference. Suitable RF transceivers include TDA 5200 series from Infineon Technologies.

According to one embodiment, pressure sensor 3 includes a g-switch to activate the pressure sensor periodically as a function of g-force. This saves battery life by taking pressure measurements more often when the vehicle is in motion, but less often when the vehicle is stationary or traveling at low speed. One of skill in the art will appreciate that many alternative configurations can provide the same advantage. For example, PCB 1 can also support an additional switch to prompt for pressure measurements at given intervals or the vehicles' on board computer can set the interval for pressure measurements.

Tire pressure sensor 101 includes a battery 5. In the illustrated embodiment, battery 5 does not overlap with PCB 1, but rather is appended to the side of PCB 1 via leads 105 to provide power to the PCB 1. Battery 5 and PCB 1 meet at point 106, generally dividing the tire pressure sensor 101 into a battery side 14 and a PCB side 15. To say that the battery 5 and PCB 1 meet implies that they may touch each other at point 106, or that there may be some space between them. Either way, this configuration provides several advantages. It reduces weight and the costs associated with PCB manufacturing and housing. Also, the design permits the battery and PCB to be oriented at an angle. Specifically, the angle between battery 5 and PCB 1 at point 106 allows the low profile tire pressure sensor 101 to conform to the rim's curved surface under high g-loading, discussed further below with reference to FIG. 4.

Still referring to FIG. 1, the tire pressure sensor 101 includes a high strength terminal 6 for securing the sensor to a valve stem by fitting the valve stem through hole 6a. Terminal 6 must be capable of securing the sensor under high g-loads and is preferably made of a high tensile material such as stainless steel. Terminal 6 can include wing members 7, indicated by dashed lines in FIG. 1. When affixed against a rim, wing members 7 acts as a structural element to provide added support and rigidity to the tire pressure sensor 101. According to one embodiment, the terminal 6 provides an electrical connection between PCB 1 and the valve stem, which allows the valve stem and terminal to function as an antenna to facilitate transmitting RF data related to the sensed tire pressure.

Figure 2:
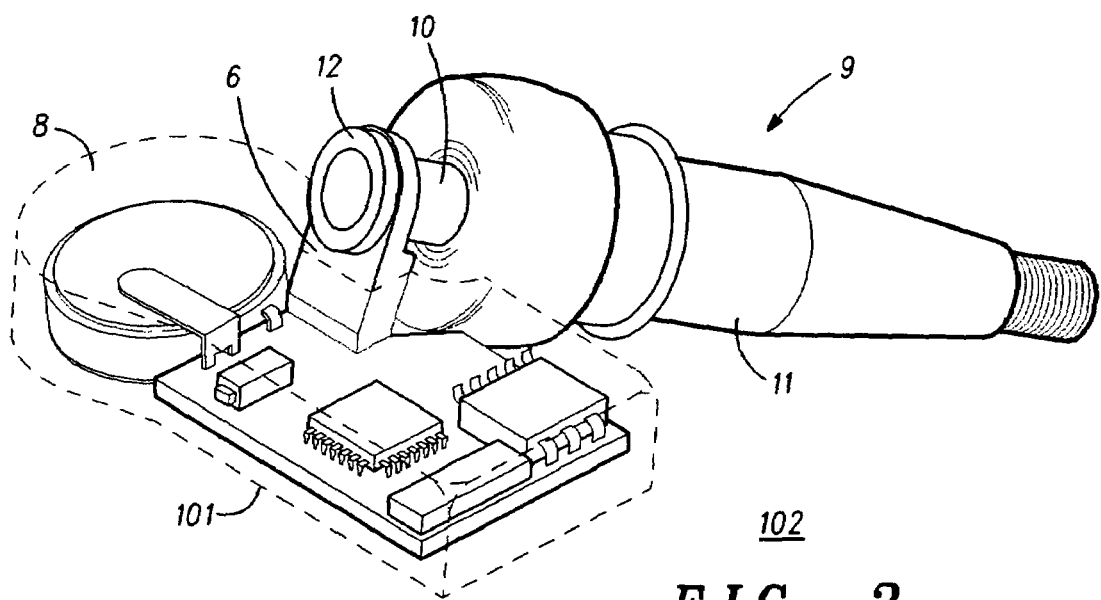
FIG. 2 illustrates an oblique view of the tire pressure sensor of FIG. 1 with a housing and installed on a valve stem assembly to form a complete tire pressure sensor assembly.

FIGS. 2-6 show the tire pressure sensor assembly 102 in its entirety. Referring first to FIG. 2, note that the tire pressure sensor 101 has been encased in a housing 8. The housing 8 does not have to provide a substantial amount of rigidity to the tire pressure sensor 101 because the sensor itself is not typically subjected to substantial forces during installation, as will be discussed further below. According to one embodiment, the housing 8 is a conformal housing, for example a conformal low pressure molded housing, comprising silicone, polyurethane, or polyamide resin (available from Henkel Corporation, Madison Heights, Mich. and Bostik-Findley, Ltd., Stafford, UK). Techniques for overmolding printed circuit boards and the like are known in the art, and hence are not further discussed.

Housing the tire pressure sensor 101 by overmolding provides several advantages over prior art sensors that are typically enclosed in a rigid housing. The overmolded housing is very low mass compared to bulkier housings and therefore the overall mass of the sensor 101 is reduced. Because the mass of the tire pressure sensor 101 and its housing 8 affects the centrifugal force these components will experience while the tire is spinning, lower mass means a lower force applied to the valve stem 10. Also, overmolding is less expensive then providing the tire pressure sensor 101 into a discrete housing, or otherwise potting the sensor 101. That being said however, the housing 8 need not be overmolded onto the tire pressure sensor 101, and could comprise other types of housings in other useful embodiments.

Continuing with the description of FIG. 2, it is noticed that the tire pressure sensor assembly 102 further comprises a valve stem assembly 9. Valve stem assembly 9 is similar to a conventional valve stem assembly, in that it contains a valve stem housing 11 that holds a valve stem 10 and is configured to fit through the valve stem opening of a tire rim. Valve stem housing 11 is typically made of a deformable material such as rubber which allows it to be snap- or press-fit into the rim opening (see FIG. 5). The valve stem 10 is traditionally made of a metal such as brass.

Despite its similarity to conventional valve stem assemblies, valve stem assembly 9 differs in that valve stem 10 extends beyond the back of the valve stem housing 11 (i.e., generally out of the page in FIG. 2). This extension provides a location to which the tire pressure sensor 101 can be attached. As shown, this attachment is achieved via terminal 6 (best shown in FIG. 1). Terminal 6 is attached to the PCB 1 of the tire pressure sensor 101 as would be an integrated circuit lead, and is coupled to the valve stem 10 in any number of ways. For example, the valve stem 10 can be inserted though hole 6a in the terminal 6, and then secured in place with an orbital rivet 12, as is shown in FIG. 2. Hole 6a can incorporate an anti-rotation key to prevent rotation of the valve stem with respect to terminal 6. This would be an expected coupling technique were it desired to sell the tire pressure sensor assembly 102 as a single unit. Alternatively, the orbital weld 10 could be replaced by a screw cap for meeting with threads on the end of the valve stem 10 (not shown). This coupling technique would be expected in an environment in which it might later be desired to decouple the tire pressure sensor 101 from the valve stem assembly 9. In any event, one of skill in the art will recognize that other arrangements for rigidly securing the sensor 101 to valve stem 10, such as bolts, riveting, or spot welds, are possible.

Notice that through this arrangement, the axis of the valve stem 10 of the valve stem section 9 and the plane of the housing 8 of the tire pressure sensor 101 are generally parallel, and the terminal 6 is generally perpendicular to both. Of course, saying that these components are "generally" parallel or perpendicular should be understood as a very relative concept. For example, saying that the terminal is generally perpendicular to the plane of the housing 8 or to the axis of the valve stem 10 implies an angle of 90 degree plus-or-minus 45 degrees.

Figure 3:
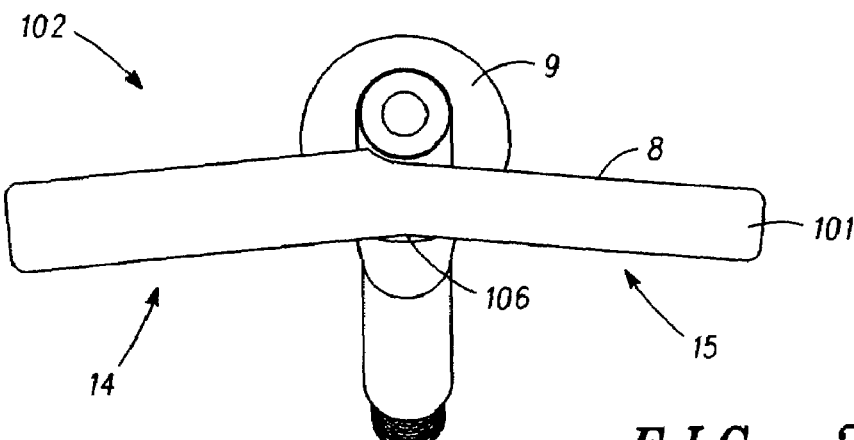
FIG. 3 illustrates a rear view of the tire pressure sensor assembly of FIG. 2.
Figure 4:
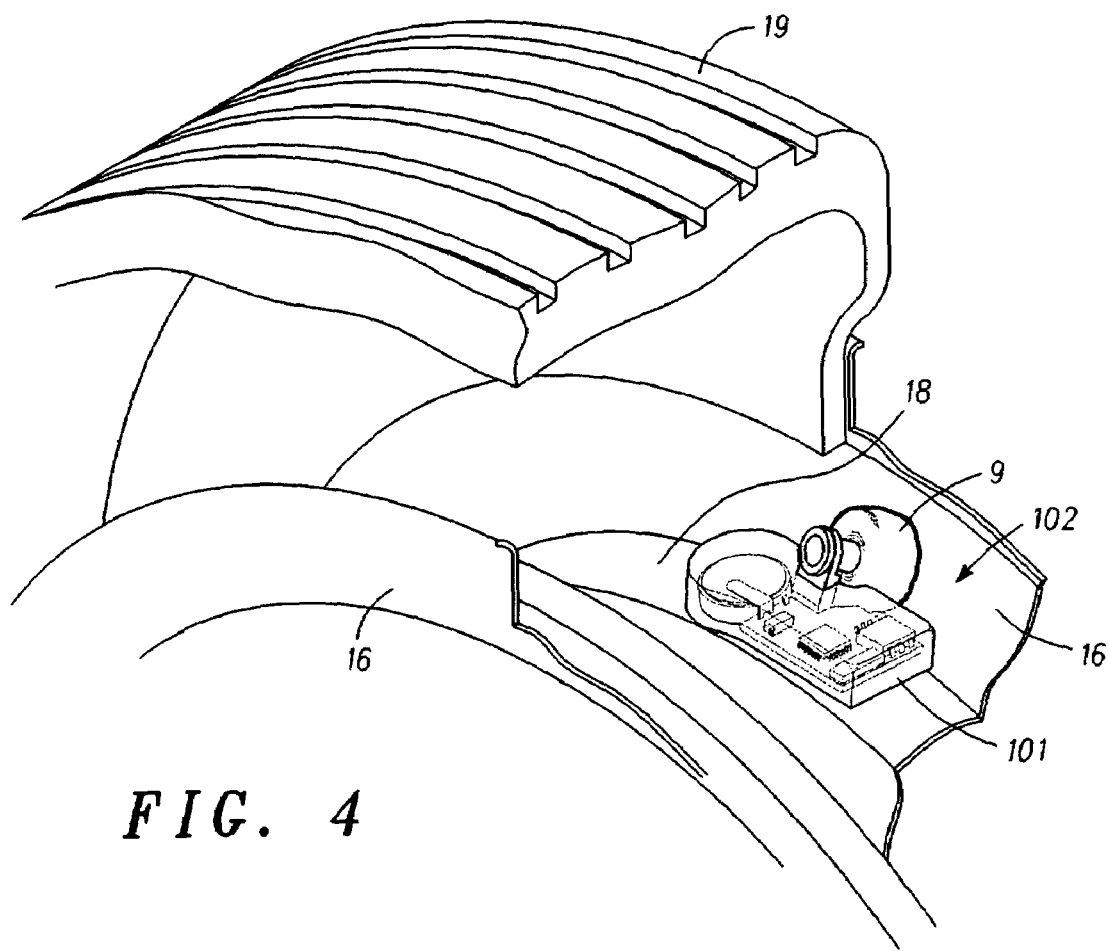
FIG. 4 illustrates the tire pressure sensor assembly of FIG. 2 as installed in a tire rim.

FIG. 3 shows a rear view of tire pressure sensor assembly 102 including valve stem assembly 9 and tire pressure sensor assembly 101. In this view, the vertex at point 106 between the battery side 14 of the sensor and the PCB side 15 of the sensor is easily apparent. As noted previously, the ability to deflect at this point prior to molding allows the tire pressure sensor 101 (and more generally the tire pressure sensor assembly 102) to conform to the curved surface 18 of the wheel rim 16, as shown in further detail in FIG. 4.

Although shown as comprising an angle, the circuitry housing 8 could also be curved to generally conform with the rim 16 of the tire, and thus denoting the housing or electronics as "angled" should be understood to imply both a sharp angle or a generally curved surface, or combinations of both.

As assembled into the rim 16, and because the valve stem assembly 9 portion is rubber and somewhat flexible, and because terminal 6 is somewhat flexible, the housed tire pressure sensor 101 when installed can be firmly biased against the rim surface 18. In this manner, and assuming tolerable levels of g-forces on the housed tire pressure sensor 101, the tire pressure sensor 101 can be made to stay firmly pinned against the rim surface 18 so that the sensor 101 will not float or "jiggle" with respect to the rim 16. Of course, tire pressure sensor assembly 102 is installed in the rim 16 prior to mounting tire 19 on the rim.

FIG. 5 illustrates how the tire pressure sensor assembly 102 can be installed into tire rim 16. When installing the assembly 102, it is preferred to first couple the valve stem assembly 9 and the housed tire pressure sensor 101 in the manners previously discussed. However, this is not strictly necessary, and instead the valve assembly portion 9 could be installed in the rim 16 first, followed by coupling of the housed tire pressure sensor 101 to the valve stem assembly 9. However, FIG. 5 assumes that tire pressure sensor assembly 102 is complete prior to installation in the rim 16.

Figure 5A:
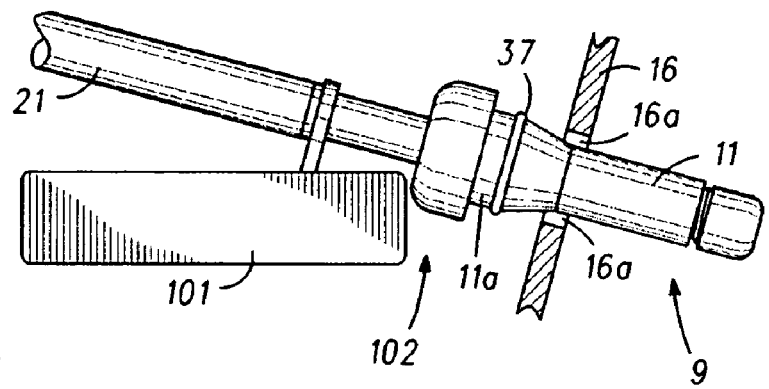
FIGS. 5A and 5B illustrate the installation of the tire pressure sensor assembly into a tire rim.
Figure 5B:
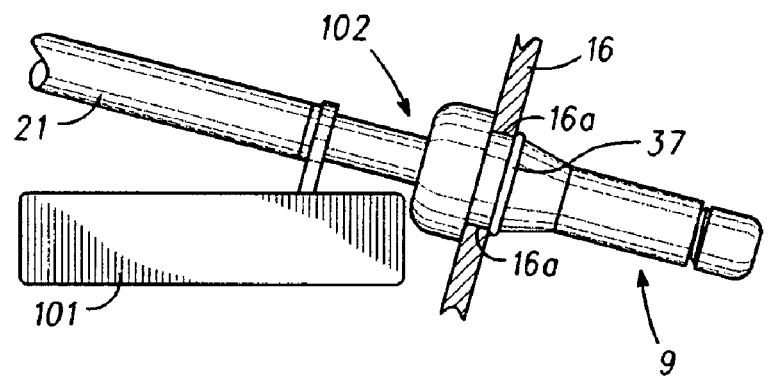
Figure 6:
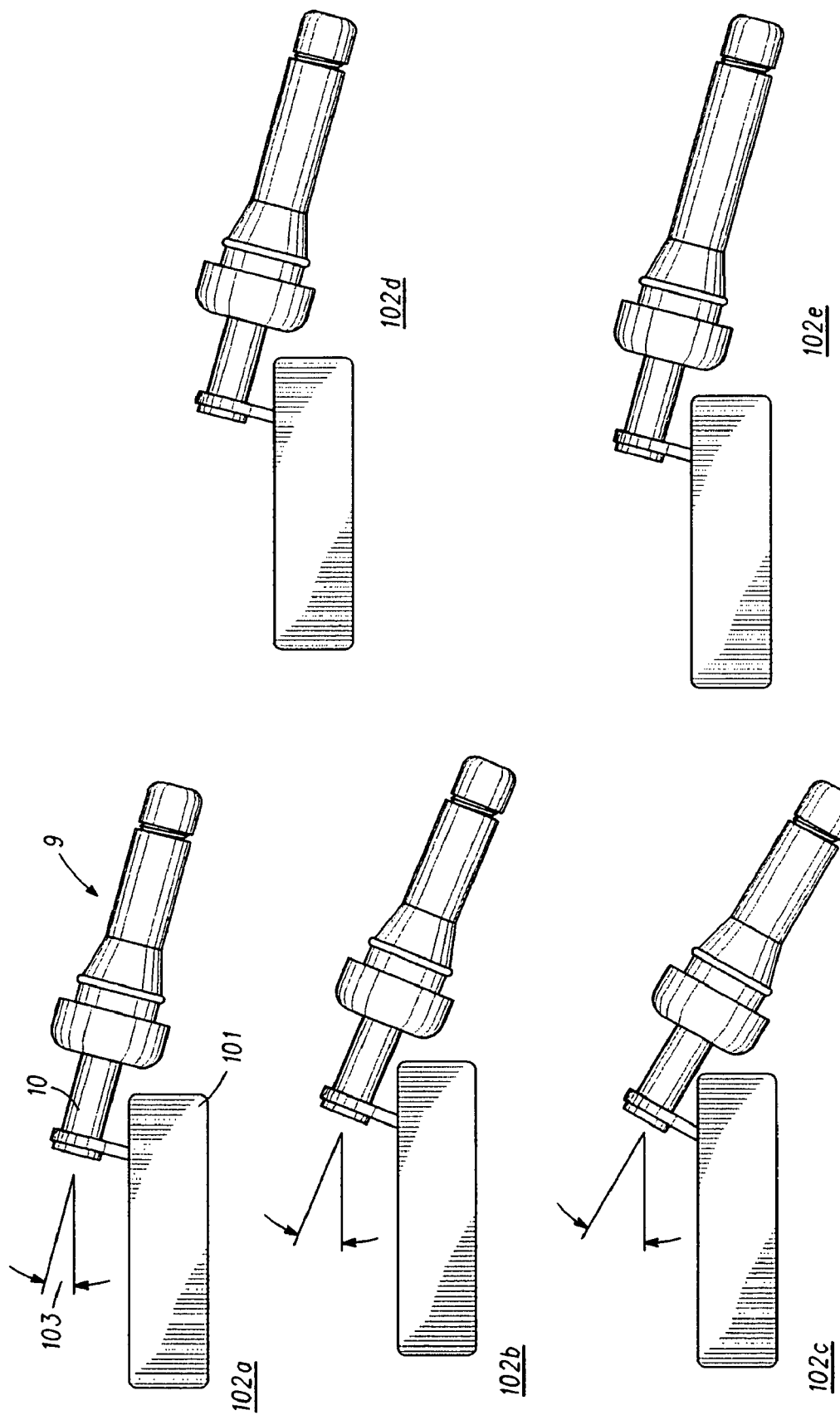
FIG. 6 illustrates the tire pressure sensor assembly as adapted to fasten to valve stem assemblies of different angles and lengths.

Referring to FIG. 5A, valve stem assembly 9 is aligned with the valve stem opening 16a in rim 16. Valve stem housing 11 typically includes an annular sealing surface 11a border by deformable retaining protrusions 37 for forming an airtight seal with the valve stem opening of rim 20. Stemmer tool 21 is used to force valve stem assembly 9 into the valve stem opening. Valve stem housing 11 must deform during installation; in particular, it typically must axially deflect. Means for allowing axial deflection to take place are disclosed in the above-incorporated U.S. patent application Ser. No. 11,144,549, filed concurrently herewith, entitled "Improved Package for a Tire Pressure Sensor Assembly." FIG. 5B illustrates the completed installation. In short, it can be seen that installation of the tire pressure sensor assembly 102 into the rim 16 can be as simple as installing a traditional valve stem. Moreover, as all of the force of the stemmer tool 21 is placed on the valve stem portion 9, undue forces are not incident on the tire pressure sensor 101 portion of the assembly 102. Therefore, the assembly 102 can be fully coupled together prior to installation, without fear of damage to the tire pressure sensor portion 101 during installation. As illustrated in FIG. 6, tire pressure sensor assembly 101 can be adapted for use with a variety of different valve stem assemblies 9 and or rim 16 or rim opening designs. Thus, the angle 103 between tire pressure sensor 101 and the valve stem assembly 9 is easily modified by adjusting the angle of terminal 6 (see FIG. 1 for a close-up of terminal 6), and this angle is shown as increasing from roughly 5 to 25 degrees between assemblies 102a, 102b, and 102c. Also, tire pressure sensor assembly 101 can be used with a variety of lengths of valve stems 12, which length is shown as increasing between assemblies 102b, 102d, and 102e.

Figure 7:
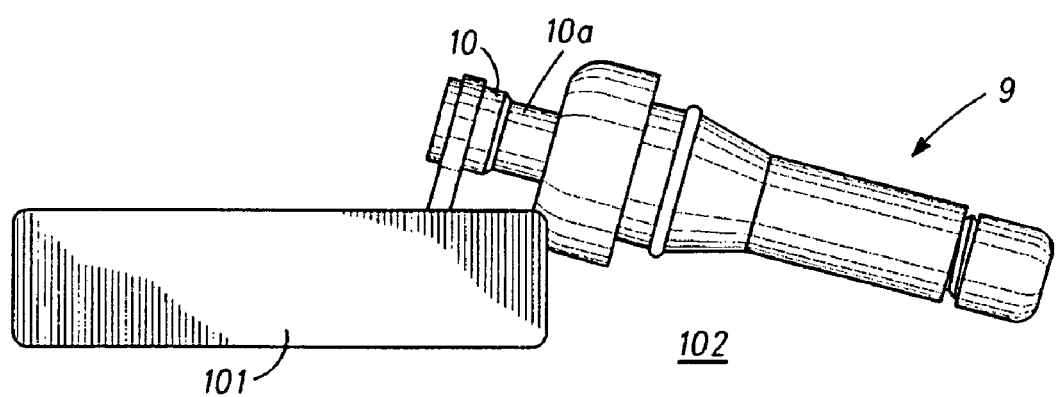
FIG. 7 illustrates the tire pressure sensor assembly having a necked-down valve stem.

As shown in FIG. 7, a portion 10a of valve stem 10 can be necked down to help meet insertion force requirements for installation of rubber valve into rim hole.

It should be understood that the inventive concepts disclosed herein are capable of many modifications. To the extent such modifications fall within the scope of the appended claims and their equivalents, they are intended to be covered by this patent.

We claim:

1. A tire pressure sensor assembly, comprising:
   a printed circuit board comprising electronics for measuring tire pressure and for transmitting an electromagnetic signal related to tire pressure;
   a battery being located adjacent to the printed circuit board;
   the printed circuit board and battery are contained in a housing that allows the printed circuit board and battery to be oriented angularly with respect to each other, defining a low-profile tire pressure sensor assembly adapted to conform to a curved surface of a tire;
   the low-profile tire pressure assembly including a battery side adapted to house the battery and a printed circuit board side adapted to house the printed circuit board and a vertex dividing the printed circuit board side and the battery side;
   a valve stem for introducing air through a rim of the tire; and
   a terminal extending outwardly from and being attached to the printed circuit board in proximity to the vertex made of a high tensile material having an opening for coupling the printed circuit board to the valve stem, the terminal being coupled to the valve stem by positioning the valve stem through the opening, wherein the terminal is generally perpendicular to the printed circuit board and the terminal is generally perpendicular to the valve stem.

2. The assembly of claim 1, wherein the valve stem comprises a housing capable of being press fit through an opening in the rim of the tire to affix the assembly in the rim.

3. The assembly of claim 1, wherein the terminal includes wing members.

4. The assembly of claim 1, wherein the low-profile tire pressure sensor assembly is overmolded.

5. The assembly of claim 1, wherein the terminal is electrically or mechanically coupled to the valve stem.

6. The assembly of claim 1, wherein the vertex defines a location where the printed circuit board and the battery substantially meet and are free from overlapping, the battery and the printed circuit board are appended via aligned leads, to provide power to the printed circuit board.

* * * * *